United States Patent Office 2,839,487
Patented June 17, 1958

2,839,487

COMPOSITION COMPRISING FURFURAL-KE-
TONE-AMINE REACTION PRODUCTS AND
AN EPOXY RESIN

Peter L. Rosamilia, Newark, and Mortimer T. Harvey,
South Orange, N. J., assignors to Harvel Research
Corporation, a corporation of New Jersey No Drawing. Application August 9, 1954
Serial No. 448,766

20 Claims. (Cl. 260—42)

This invention relates to novel compositions of matter and methods for preparing them and also to novel products and articles of manufacture in which one or a combination of two or more of said novel compositions are employed as components.

In one of its more specific aspects the invention is directed to reaction products of (I) monomeric or polymeric furfural-ketone organic reaction products with (II) an amine containing at least one active hydrogen in an amino group thereof.

Reaction products (I) are furfural-ketone reaction products produced by reacting under alkaline conditions furfural and one or a combination of two or more ketones having at least two hydrogen atoms on an alpha carbon and also such reaction products which have been thickened or homopolymerized under acidic or alkaline conditions, all being well known to the art. All of said reaction products (I) employed in the practice of this invention are liquid at 300° F. Such products and methods for producing them are disclosed in U. S. Patents 2,363,829, 2,461,510 and 2,545,461.

According to this invention one or a combination of two or more of said products (I) are reacted with one or a combination of two or more of products (II). Products (II) are strongly alkaline amines and of such amines we prefer to employ those which are polyamines. The following are illustrative general examples of the strongly alkaline amines suitable for the practice of the present invention: primary amines, polyprimary amines, diamines and polydiamines, triamines, tetramines, and others which are equivalents of the more particular or specific examples given herein. Illustrative particular or specific examples of amines suitable for the practice of the present invention are ethanolamine, ethylene diamine, propyl diamine, diethylene triamine, triethylene tetramine, dimethylamino propylamine, morpholine, phenylene diamine, 2 - amino-2-methyl-1-propanol, aminophenol, piperidine and dicyandiamide. We prefer to employ those amines which contain at least 2 $NH_2$ groups as well as those which contain at least 2 NH groups, said amines being commonly known as polyprimary amines and polysecondary amines, respectively.

The following Examples 1–16 are set forth merely by way of illustrating methods which may be followed to produce starting materials, products (I), to be employed in the practice of the present invention, all parts being by weight unless otherwise specified.

Example 1

The following materials in the given proportions were used in making a furfural-ketone resin:

1800 parts furfural
945 parts acetone
16 parts caustic soda
32 parts water
20.75 parts sulfuric acid
41.5 parts water A mixture of 16 parts of caustic soda and 32 parts of water is prepared and allowed to cool. In a separate container, a mixture of 20.75 parts of sulfuric acid and 41.5 parts of water is prepared. Into a Monel metal unit equipped with stirrer and having cold water on the jacket, a mixture of 200 parts furfural and 105 parts of acetone is weighed in. One-ninth of the caustic soda water solution is added and the mass is allowed to react. When the temperature stops rising another prepared batch of 200 parts furfural and 105 parts of acetone is pumped into the unit and another one-ninth of the caustic soda-water solution is added whereupon the temperature rises. When the temperature stops rising there is added thereto another prepared batch of 400 parts of furfural and 210 parts of acetone and subsequently two-ninths of the caustic soda-water solution. Thereafter a prepared batch of 500 parts of furfural and 262.5 parts of acetone is pumped into the unit and another two-ninths of the caustic soda-water solution is added and then finally the remaining batch consisting of 500 parts of furfural and 262.5 parts of acetone is added and the remainder of the caustic soda-water solution. The entire mass is refluxed for 30 minutes at 190–195° F. Chilling is then started and the sulphuric acid solution is added to neutralize the mass which is then chilled to 125° F. and vacuum applied for dehydration. Heat is applied and vacuum continued until the temperature reaches 195° F. Thereupon the heat and vacuum are cut off, chilling started, samples taken and when cooled to 150° F. the mass is pumped to a storage tank. This product is a starting material known herein as material FK1.

Example 2

96 grams furfuraldehyde
58 grams acetone, and
12½ cc. NaOH in 25 grams of water were mixed together whereupon an exothermic reaction occurred. After the exothermic reaction had subsided, the mass was heated to boiling and maintained in this state of boiling in a reflux condenser for approximately 1 hour. The mass was then neutralized with dilute sulfuric acid and was subsequently dehydrated under vacuum and is a starting material hereinafter known as material FK2.

In the Examples 3 to 16, below, generally the steps described in Examples 1 and 2 were employed and the materials listed in stated quantities were used.

Example 3

96 grams furfural
72 g. methyl ethyl ketone, and
4.4 cc. of a 33% solution of NaOH in water were used to produce product FK3.

Example 4

100 g. furfural
100 g. methyl isobutyl ketone, and
1 g. NaOH in 2 g. water were used to produce product FK4.

Example 5

200 g. furfural
232 g. diacetone alcohol, and
1 g. NaOH in 1 g. water were used to produce product FK5

Example 6

100 g. furfural
138 g. isophorone, and
5 g. NaOH in 10 g. water were used to produce product FK6.

Example 7
96 g. furfural
138 g. phorone, and
1 g. NaOH in 2 g. water were used to produce product FK7.

Example 8
96 g. furfural
98 g. cyclohexanone, and
1 g. NaOH in 2 g. water were used to produce product FK8.

Example 9
96 g. furfural
98 g. mesityl oxide, and
1 g. NaOH in 2 grams of water were used to produce product FK9.

Example 10
96 g. furfural
120 g. acetophenone, and
1 g. NaOH in 2 g. water were used to produce product FK10.

Example 11
96 g. furfural
114 g. methyl n-amyl ketone, and
1 g. NaOH in 2 g. water were used to produce product FK11.

Example 12
96 g. furfural
114 g. acetonylacetone (hexandione-2.5), and
1 g. NaOH in 2 g. water were used to produce product FK12.

Example 13
96 g. furfural
28 g. acetonylacetone, and
1 g. NaOH in 2 g. water were used to produce product FK13.

Example 14
96 g. furfural
14 g. acetonylacetone, and
1 g. NaOH in 2 g. water were used to produce product FK14.

Example 15
96 g. furfural
86 g. diethyl ketone, and
1 g. NaOH in 2 g. water were used to produce product FK15.

Example 16
96 g. furfural
140 g. diisobutyl ketone, and
20 g. NaOH in 40 g. water were used to produce product FK16.

If desired, the various reaction products of Examples 1–16 may be maintained at 180–300° F. under pH conditions of approximately 9–11 or 1.5 to 2.5 to thicken or homopolymerize them under either alkaline or acidic conditions depending upon what is required but in all cases the heat is removed and thickening discontinued at the appropriate time so that when cooled to room temperature, after first having been neutralized, the resultant product is either a viscous liquid at room temperature or may be a solid, and both the liquid and solid are liquid at 300° F.

According to this invention there are reacted together one or a combination of two or more of products (I) and one or a combination of two or more of products (II) to provide novel and highly useful compositions of matter finding utility in a number of different fields. The novel reaction products of (I) and (II) may be either liquid or solid and fusible or infusible depending upon the state of (I) employed and/or the proportions of (II) reacted therewith and the temperature and time of heating.

Those novel reaction products of (I) and (II) whether in the normally liquid or solid state but liquid at 300° F., may be compounded with one or a combination of two or more of products (III). Products (III) are natural rubber, reclaimed rubber, rubbery polymers of chloroprene, rubbery copolymers of butadiene and styrene and rubbery copolymers of butadiene and acrylonitrile. Said novel reaction products of (I) and (II) when compounded with (III) impart thereto increased ozone resistance, heat resistance and improve the ageing characteristic. In general the amount of the novel reaction product of (I) and (II) when compounded with (III) may be 2–50 parts by weight of the former to 100 parts of the latter. Such compounded rubbery products find especial application as electrical insulation, hose belts, etc.

The novel reaction products of (I) and (II), liquid at 300° F., also find particular application in combination with the Epon or epoxy resins (IV). Such Epon resins are also known to the art as glycidyl ethers of phenols. Examples of some of them are described in the U. S. patent to Wasserman, No. 2,665,226 of January 5, 1954, and also those marketed by the Ciba Company as epoxy resins Nos. 502, 503 and 283 and by the Shell Chemical Corporation as epoxy resins Nos. 828, 834, 1001, 1004, 1007, etc.

Those novel reaction products of (I) and (II) either in the liquid or solid state but liquid at 300° F. either alone or in combination of two or more of them, in general may be combined with one or a combination of two or more of (IV) in the ratio by weight of 1 part of the former to 100 parts of (IV) to 5 parts of (IV) to 100 parts of the former. Said combinations of reaction products (I) and (II) with (IV) find utility in a number of different fields. They may be used for coating and impregnating of wood, metal, concrete, fabrics such as matted or woven cotton, glass, nylon, silk, paper, etc., as potting compounds for electrical coils, transformers, etc. and subsequently cured at room or elevated temperatures depending upon requirements.

The following examples are given to illustrate the invention and are not to be taken by way of limitation, all parts being given by weight unless otherwise specified.

Example A
100 parts of FK1
50 parts of diethylene triamine are mixed together and an exothermic reaction ensues. After a period of 24 hours, the mass is substantially solid at room temperature but is liquid at 300° F. and is known hereinafter as product AP. A portion of the reaction mass was maintained at 300° F. for 24 hours and at the end of that period was found to be substantially solid and infusible, that is, it remained solid at 500° F. and is known herein as product AF.

Example B
100 parts of FK2
25 parts of triethylene tetramine were mixed together whereupon an exothermic reaction ensues. At the end of 24 hours the mass will be a solid at room temperature but liquid at 300° F. and is known hereinafter as product BP. A portion of BP was maintained at 300° F. for 24 hours and at the end of that period will be a substantially solid and infusible mass, that is, it will remain solid at 500° F. and is known herein as product BF.

Example C
100 parts of FK3
10 parts of diethylene triamine were mixed together whereupon an exothermic reaction ensues. At the end of 24 hours the reaction mass is a viscous mass, liquid at room temperature and is known herein as product CP.

Example D

Employing the same procedure as that set forth in Example C but replacing the 100 parts of FK3 with 100 parts of one or a combination of two or more of the products FK4–FK16, there is obtained a wide variety of reaction products, all liquid at room temperature and all known herein as products DP.

Example E 100 parts of FK1
35 parts of ethanolamine were mixed together and an exothermic reaction ensues. At the end of 24 hours, the reaction mass is a solid at room temperature and liquid at 300° F. and is known herein as product EP. A portion of EP was maintained at 300° F. for 24 hours and at the end of this period it will be an infusible solid, that is, it will remain solid at 500° F.

Example F 100 parts of FK2
35 parts of ethylene diamine were mixed together whereupon an exothermic action ensues and at the end of 24 hours will, at room temperature, be a solid reaction mass but liquid at 300° F. and known as product FP. A portion was maintained at 300° F. for 24 hours and at the end of that period is a substantially infusible solid, that is, it will remain solid at 500° F. and is herein known as product FF.

Example G 100 parts of homopolymerized FK1 (homopolymerized at about 220° F. under pH conditions of approximately 9 until its viscosity at 25° C. is about 10 times that of the original FK1)
10 parts of diethylene triamine were mixed together and an exothermic reaction ensues and after being allowed to stand for 24 hours will be a reaction product liquid at 300° F. and is known herein as product GP.

Example H 100 parts of homopolymerized FK1 (homopolymerized at about 200° F. under pH conditions of approximately 2.8 until its viscosity at 25° C. is about 12 times that of the original FK1)
10 parts of ethylene diamine were mixed together and an exothermic reaction ensues and after 24 hours will be a reaction product liquid at 300° F. and is known herein as product HP.

Example I 100 parts of product FK1
100 parts of FK9
25 parts of triethylene tetramine were mixed together whereupon an exothermic reaction ensues and after 24 hours is a reaction product liquid at 300° F. and known herein as product IP.

While there is an exothermic reaction between (I) and (II) it sometimes may be found convenient to hasten the reaction towards completion. This may be accomplished by the application of external heat as the temperature of the exothermically reacting mass decreases after it has reached maximum. The temperatures of reaction may vary and in general are in the range between 150° F. to 375° F. and the time also is variable depending upon whether or not external heat is applied.

Example J 100 parts of FK1
50 parts of diethylene triamine were mixed together whereupon exothermic reaction ensues and reaches approximately 170° F. Then the temperature begins to fall and external heat is applied to raise it to about 275° F.–300° F. and is so maintained for about 45 minutes after which time heating was discontinued and the mass was discharged into a shallow pan and allowed to cool to room temperature. The mass, at room temperature, was a brittle, easily comminutible solid, liquid at 300° F. and known herein as product JP. Then 15 parts of JP was mixed with 1 part of dicyandiamide and the mix was ground together for intimate mixture which when placed in an oven at 300° F. for 1 hour, was cured to a hard, tough, solid infusible mass, which remained solid at 500° F. and this product is known herein as product JF.

Examples K and L

Using the same procedure and components as those set forth in Example J except that the proportion of the diamine employed is one-quarter and one-tenth of FK1 instead of one-half as set forth in Example J. The resultant products obtained were KP and LP which were solids but liquid at 300° F. and when reacted with the dicyandiamide, produced infusible products known herein as products KF and LF.

All of those reaction products of (I) and (II) which are liquid at 300° F., examples of which are shown in Examples A–L herein may be compounded with one or more of a rubbery material (III) herein set forth by using a rubber mill or Banbury mixer and subsequently cured to improve their characteristics as hereinbefore set forth. The solid infusible reaction products of (I) and (II), examples of which are set forth in Examples A, B, E, F, J, K and L may be comminuted to a fine dust which may be incorporated as discrete particles in brake linings and there serve as friction augmenting materials.

All of said reaction products of (I) and (II) which are liquid at 300° F. may be intimately combined either alone or in combinations of two or more of them with (IV) one or a combination of two or more epoxy resins which epoxy resins are also liquid at 300° F. to provide novel commercial compositions finding application in a variety of different fields. Such compositions may be applied in a number of different ways depending upon the uses to which they are to be put and subsequently cured. The presence of these reaction products of (I) and (II) therein enhance the tensile and impact strength and also the heat resistance thereof when compared with cured epoxy resins per se.

Example M 100 parts of product AP
100 parts of "Shell Epon 1001"
12 parts of dicyandiamide

Example N 100 parts of product BP
100 parts of "Shell Epon 1001"
12 parts of dicyandiamide

Example O 100 parts of product CP
100 parts of "Shell Epon 1001"
12 parts of dicyandiamide

Example P 50 parts of product EP
100 parts of "Shell Epon 1004"
8 parts of dicyandiamide

Example Q 25 parts of product JP
100 parts of "Shell Epon 1007"
7.5 parts of dicyandiamide

Example R 30 parts of product KP
100 parts of "Shell Epon 1004"
8 parts of dicyandiamide

Example S 20 parts of product LP
100 parts of "Shell Epon 1001"
7 parts of dicyandiamide

Example T 25 parts of product AP
50 parts of "Shell Epon 1001"
50 parts of "Shell Epon 1004"
7.5 parts of dicyandiamide

Example U 25 parts of product AP
10 parts of product BP
100 parts of "Shell Epon 1004"
8 parts of dicyandiamide

Example V 25 parts of product AP
5 parts of product BP
50 parts "Shell Epon 1001"
50 parts of "Shell Epon 1004"
8 parts of dicyandiamide Said various "Shell Epons" of Examples M–V are described in the publication "Epon Resins for Surface Coatings," by Shell Chemical Corporation, as "Technical Publication SC:52-31.

The dicyandiamide is included as a component in the formulations M–V to speed the reaction and thereby facilitate the curing. It is to be understood that the quantity thereof may be reduced or eliminated entirely, but if done, longer curing cycles are required.

Employing the formulations set forth in Examples M–V the components are thoroughly and intimately mixed together by grinding the mixtures to provide a series of powdered masses which are stable and may be used as and when desired. They may be flowed, sprayed or spread on an object such as a fabric or metal sheet or other base, or between a pair of sheets of fabric or metal and then cured by the use of heat at about 300° F.– 350° F. for about 3 to 6 hours to provide a hard, tough coating or adhesive which will not fuse at 500° F. They can also be combined with fillers and asbestos to provide mixtures, which molded and cured, provide conduits, brake linings, clutch facings, etc.

Any one or a combination of two or more of those novel reaction products of (I) and (II), which are liquid at 300° F. and described in Examples A–L or any one or a combination of two or more of the combinations thereof with epoxy resins, examples of which are the formulations set forth in Examples M–V may be compounded with one or a combination of two or more of the rubbery materials (III) with the ratio by weight of the former to (III) being 1 part of the former to 100 parts of (III) to 100 parts of the former to 5 parts of (III).

This application is a continuation in part of our copending application Serial No. 379,068, filed September 8, 1953.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to our novel compositions of matter herein claimed without departing from the spirit of the invention. Particularly it is to be understood that in said claims, ingredients or components recited in the singular are intended to include compatible mixtures of said ingredients wherever the sense permits.

Having thus described our invention, what we claim is:

1. A reaction product of an amine containing at least one active hydrogen in an amino group thereof and an organic product liquid at 300° F. and selected from the group consisting of (a) reaction products produced by reacting under alkaline conditions furfural and a ketone having at least two hydrogen atoms on an alpha carbon and (b) homoploymers of (a).

2. A reaction product defined in claim 1, said product being liquid at 300° F.

3. A reaction product defined in claim 1, said product being substantially solid at 500° F.

4. A reaction product defined in claim 1 intimately combined with an epoxy resin, said epoxy resin being a glycidyl ether of a phenol.

5. A resin produced by heat curing an intimate combination of a reaction product defined in claim 1 and any epoxy resin liquid at 300° F., said resin being substantially solid at 500° F., said epoxy resin being a glycidyl ether of a phenol.

6. A resin produced by heat curing an intimate combination of a reaction product defined in claim 1, an epoxy resin liquid at 300° F. and an amine containing at least one active hydrogen in an amino group thereof, said resin being substantially solid at 500° F., said epoxy resin being a glycidyl ether of a phenol.

7. A reaction product of a polyprimary amine containing at least one active hydrogen in an amino group thereof and an organic product liquid at 300° F. and selected from the group consisting of (a) reaction products produced by reacting under alkaline conditions furfural and a ketone having at least two hydrogen atoms on an alpha carbon and (b) homoploymers of (a).

8. A reaction product defined in claim 7 intimately combined with an epoxy resin, said epoxy resin being a glycidyl ether of a phenol.

9. A resin produced by heat curing an intimate combination of a reaction product defined in claim 7 and an epoxy resin liquid at 300° F., said resin being substantially solid at 500° F., said epoxy resin being a glycidyl ether of a phenol.

10. A reaction product of a polysecondary amine containing at least one active hydrogen in an amino group thereof and an organic product liquid at 300° F. and selected from the group consisting of (a) reaction products produced by reacting under alkaline conditions furfural and a ketone having at least two hydrogen atoms on an alpha carbon and (b) homoploymers of (a).

11. A resin produced by heat curing an intimate combination of a reaction product defined in claim 10 and an epoxy resin liquid at 300° F., said resin being substantially solid at 500° F., said epoxy resin being a glycidyl ether of a phenol.

12. A reaction product of diethylene triamine and an organic product liquid at 300° F. and selected from the group consisting of (a) reaction products produced by reacting under alkaline conditions furfural and a ketone having at least two hydrogen atoms on an alpha carbon and (b) homopolymers of (a).

13. A resin produced by heat curing an intimate combination of a reaction product defined in claim 12 and an epoxy resin liquid at 300° F., said resin being substantially solid at 500° F., said epoxy resin being a glycidyl ether of a phenol.

14. A reaction product of triethylene tetramine and an organic product liquid at 300° F. and selected from the group consisting of (a) reaction products produced by reacting under alkaline conditions furfural and a ketone having at least two hydrogen atoms on an alpha carbon and (b) homopolymers of (a).

15. A resin produced by heat curing an intimate combination of a reaction product defined in claim 14 and an epoxy resin liquid at 300° F., said resin being substantially solid at 500° F., said epoxy resin being a glycidyl ether of a phenol.

16. A reaction product of ethylene diamine and an organic product liquid at 300° F. and selected from the group consisting of (a) reaction products produced by reacting under alkaline conditions furfural and a ketone having at least two hydrogen atoms on an alpha carbon and (b) homopolymers of (a).

17. A resin produced by heat curing an intimate combination of a reaction product defined in claim 16 and an epoxy resin liquid at 300° F., said resin being substantially solid at 500° F., said epoxy resin being a glycidyl ether of a phenol.

18. A reaction product of ethanolamine and an organic product liquid at 300° F. and selected from the group consisting of (a) reaction products produced by reacting under alkaline conditions furfural and a ketone having at least two hydrogen atoms on an alpha carbon and (b) homopolymers of (a).

19. A resin produced by heat curing an intimate combination of a reaction product defined in claim 18 and an epoxy resin liquid at 300° F., said resin being substantially solid at 600° F., said epoxy resin being a glycidyl ether of a phenol.

20. A reaction product of an amine containing at least one active hydrogen in an amino group thereof and acetone-furfural reaction product.

References Cited in the file of this patent
UNITED STATES PATENTS

| | | |
|---|---|---|
| 2,461,510 | Harvey | Feb. 15, 1949 |
| 2,506,486 | Bender et al. | May 2, 1950 |